UNITED STATES PATENT OFFICE.

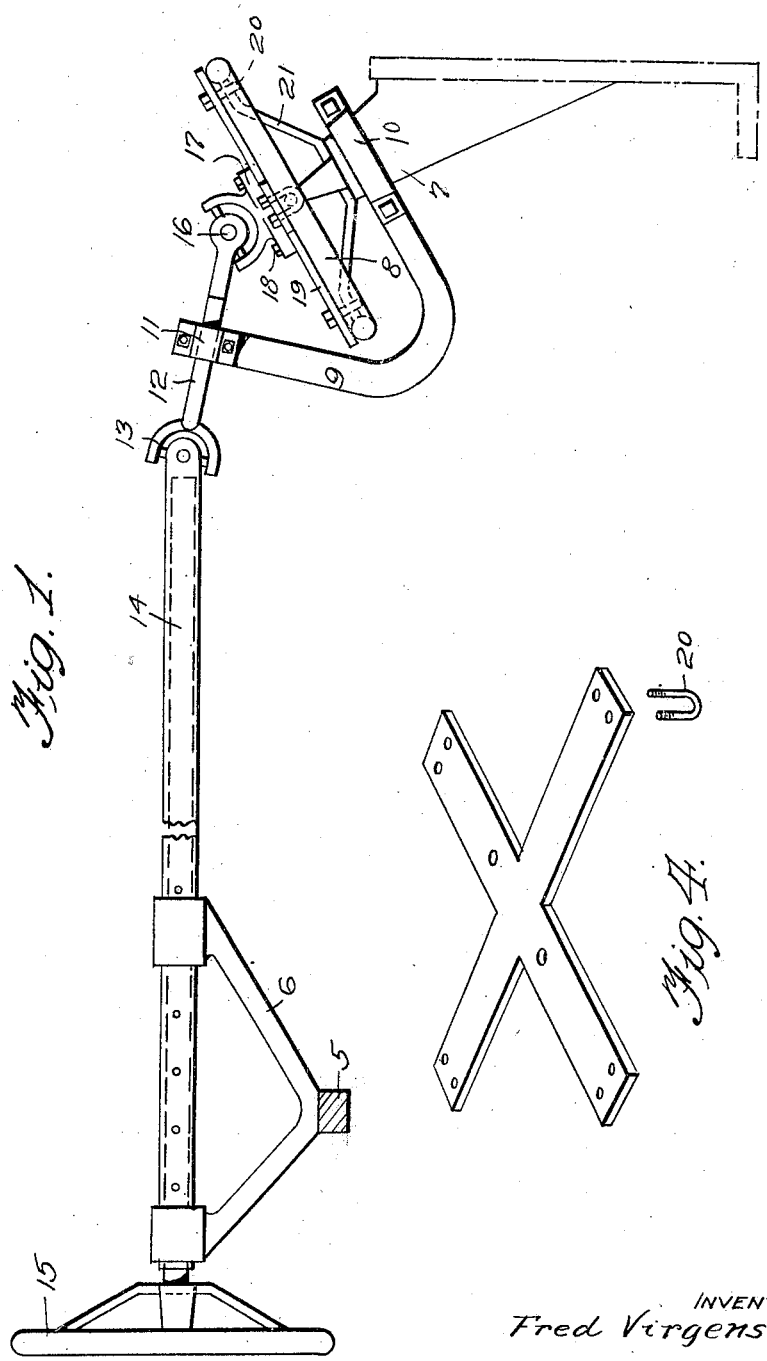

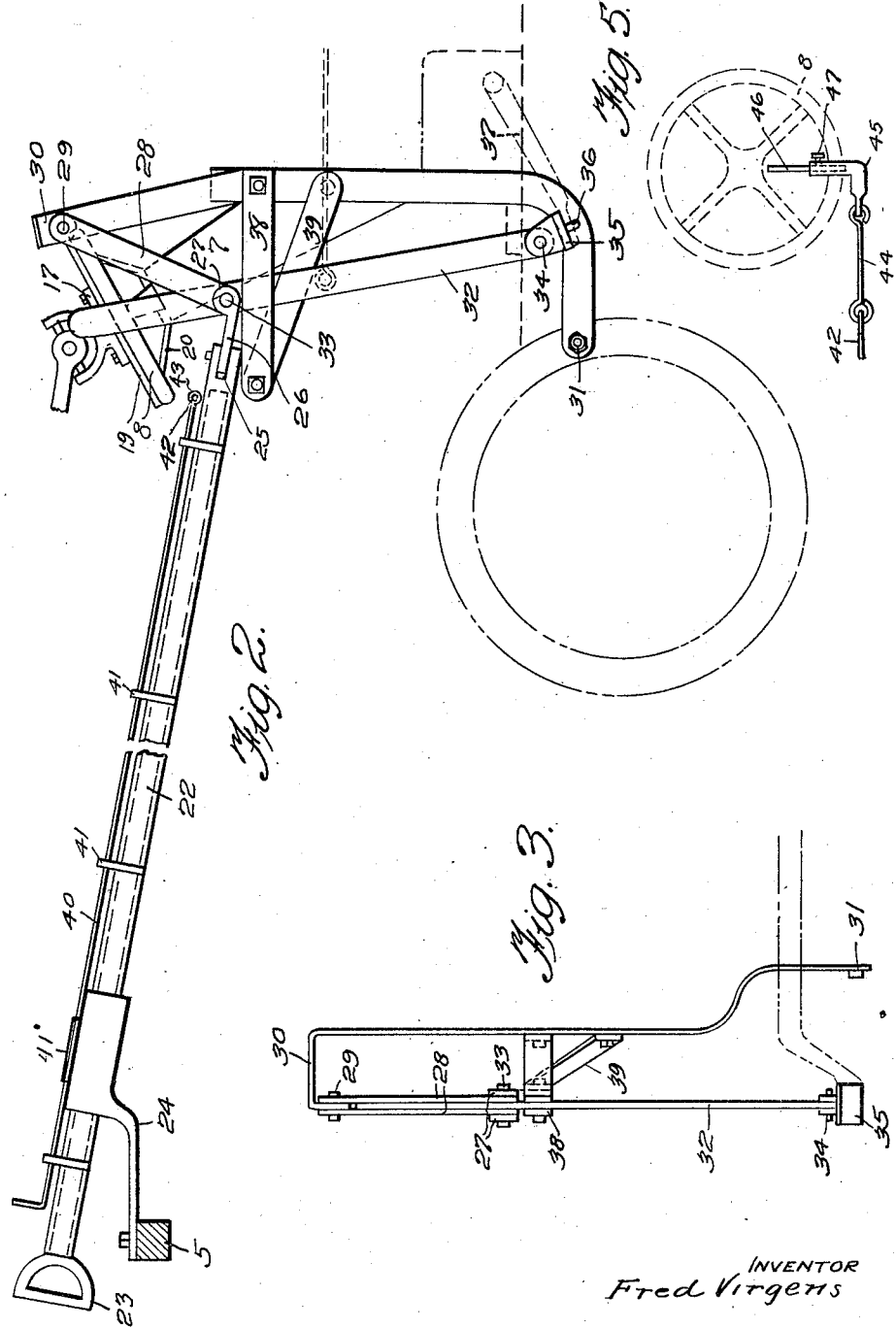

FRED VIRGENS, OF FAIRMONT, MINNESOTA.

CONTROLLING MECHANISM FOR TRACTORS.

1,377,448.    Specification of Letters Patent.    Patented May 10, 1921.

Application filed April 2, 1920. Serial No. 370,666.

*To all whom it may concern:*

Be it known that I, FRED VIRGENS, citizen of the United States, residing at Fairmont, in the county of Martin and State of Minnesota, have invented certain new and useful Improvements in Controlling Mechanisms for Tractors, of which the following is a specification, reference being had therein to the accompanying drawings.

This invention relates to a controlling mechanism for tractors by means of which the clutch, fuel control, and steering mechanism of a tractor may be actuated from a distant point as, for example, from a grain binder or other agricultural machine which is drawn by the tractor.

Further objects and advantages of the invention will be set forth in the detailed description which now follows.

In the accompanying drawing in which like numerals designate corresponding parts throughout the several figures of the drawing—

Figure 1 is a side elevation of the steering mechanism.

Fig. 2 is a side elevation of the clutch and gas controlling connections.

Fig. 3 is a rear view of the support of the clutch, and

Fig. 4 is a perspective view of a spider hereinafter described.

Fig. 5 illustrates a detail.

In the drawing 5 designates an element which may be any part of a grain binder or other agricultural implement or machine and 6 designates a supporting bracket carried thereby. 7 designates the steering post and 8 the steering wheel of a well known tractor, it being understood that the agricultural machine 5 is to be drawn by the tractor in the usual and well known way. A bearing bracket 9 is secured to the tractor steering post at 10 and is provided with a bearing 11 for a shaft 12. A universal joint 13 at one end of this shaft establishes connection between the shaft and an extension rod or sleeve 14 that is rotatively supported in the bracket 6 and carries a hand wheel 15. The other end of the shaft 12 is connected by a universal joint 16 with a plate 17 that is bolted at 18 to a spider 19. This spider is connected by the U-clips 20 with the spokes 21 of the steering wheel 8 of the tractor. Thus it will be seen that rotation of the wheel 15 in a vertical plane will impart rotation to the steering wheel of the tractor.

In order to effectively control the tractor from a distant point it is manifest that it is not only necessary to be able to steer the same but that means must be provided whereby the clutch and fuel control of the tractor may be effected from the distant point. With this end in view I provide a longitudinally shiftable rod 22 having an operating handle 23 and supported in a bracket 24 that is carried by the part 5 or any other suitable part of the agricultural implement, or machine. The forward end of the rod 22 is bifurcated at 25 for the reception of a tang 26 that carries spaced ears 27. A pair of links 28 is hung at 29 upon a pivot that is carried by a bracket 30, said bracket being secured at 31 to one of the bolts of the crank case of the tractor. The ends of the links 28 and a lever 32 are received between the ears 27 and these ears and the links and the lever 32 are all traversed by a pivot 33. The lower end of the lever 32 is pivotally connected at 34 to a shoe 35 that is in turn connected at 36 to the other end of the clutch lever 37 of the tractor. In the ordinary operation of the tractor this clutch lever is engaged by the foot of the operator; downward pressure upon the outer end of the lever releasing the clutch and the clutch coming into action when said lever is released. Thus it will be seen that if the rod 22 is thrust forwardly by pressure applied to the handle 23 it will tend to bring the links 28 into longitudinal alinement with the lever 32 and this will exert a downward thrust upon said lever 32 with the result that the clutch will be released. Guide strips 38 and 39 are supported from the bracket 33 and act to guide the lever 32 and prevent excessive lateral movement thereof. For controlling the throttle or fuel supply a rod 40 is mounted in bearings 41 and an eye 42 thereof is engaged with a corresponding eye 43 of a link 44. This link is connected to an L shaped coupling 45 which engages the throttle lever 46, and is held thereon by a set screw 47. The rod 40 slides freely with respect to bearings 41 but is frictionally engaged by bearing 41' in such manner as to prevent accidental shifting of said rod.

From the foregoing description it will be seen that simple and efficient means are herein provided for accomplishing the objects of the invention. However, it is to be understood that the invention is not limited to the precise construction set forth but that it includes within its purview whatever changes fairly come within either the terms or the spirit of the appended claims.

Having described my invention, what I claim is—

1. The combination with a pair of vehicles one of which is self propelled and is provided with a clutch controlling lever, of a fixed support carried thereby, a toggle mechanism between said support and the clutch lever and a manually operable extension shaft connected with said toggle mechanism for actuating the same.

2. The combination with a pair of vehicles one of which is self propelled and provided with a clutch controlling lever, of a lever having pivotal connection with said clutch controlling lever, a fixed support, a link pivoted to said fixed support and to the lever that is pivoted to the clutch controlling lever and a manually operable member having pivotal connection with the link and the last named lever.

3. A structure as recited in claim 2 in combination with a fuel controlling mechanism supported upon said extension shaft.

4. The combination with a pair of vehicles one of which is self propelled and is provided with a steering column and steering wheel, of a bracket fixed to the steering column and having an end bent upwardly above the steering wheel, a bearing carried by said bracket, a short shaft journaled in said bearing, a universal joint at that end of the short shaft adjacent the steering wheel of the self propelled vehicle, means for securing one of the parts of said universal joint to the spokes of the steering wheel of the self propelled vehicle, a substantially horizontal shaft extending to the other of said vehicles from the universal joint at the other end of the short shaft and a steering wheel carried by said extending shaft.

In testimony whereof I hereunto affix my signature.

FRED VIRGENS.